Figure 1:
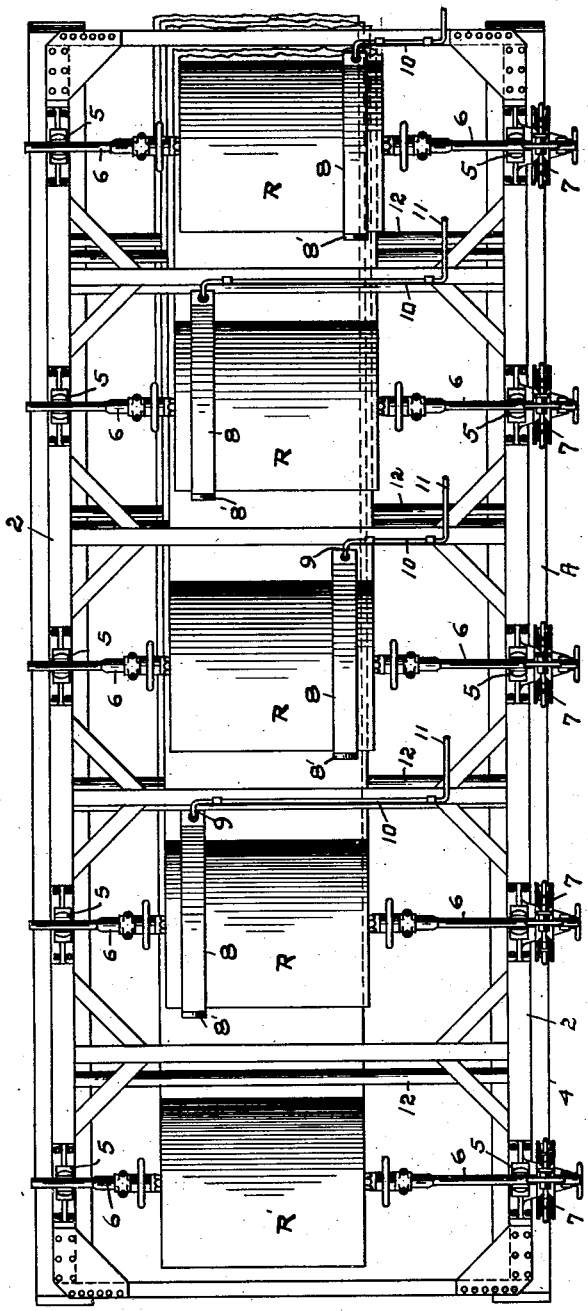

Feb. 13, 1934.  R. W. JAITE  1,947,396

MACHINE FOR MAKING PAPER BAGS

Filed June 19, 1931  8 Sheets-Sheet 1

INVENTOR
ROY W. JAITE
BY Fisher, Mosin + Moore
ATTORNEY

Feb. 13, 1934.      R. W. JAITE      1,947,396
MACHINE FOR MAKING PAPER BAGS
Filed June 19, 1931      8 Sheets-Sheet 2

ROY W. JAITE
Fisher, ——— ATTORNEY

Feb. 13, 1934.                R. W. JAITE                1,947,396
                   MACHINE FOR MAKING PAPER BAGS
                   Filed June 19, 1931    8 Sheets-Sheet 6

INVENTOR
ROY W. JAITE
BY
Fisher, Moser & Moore.
ATTORNEY

Feb. 13, 1934.   R. W. JAITE   1,947,396
MACHINE FOR MAKING PAPER BAGS
Filed June 19, 1931   8 Sheets-Sheet 7
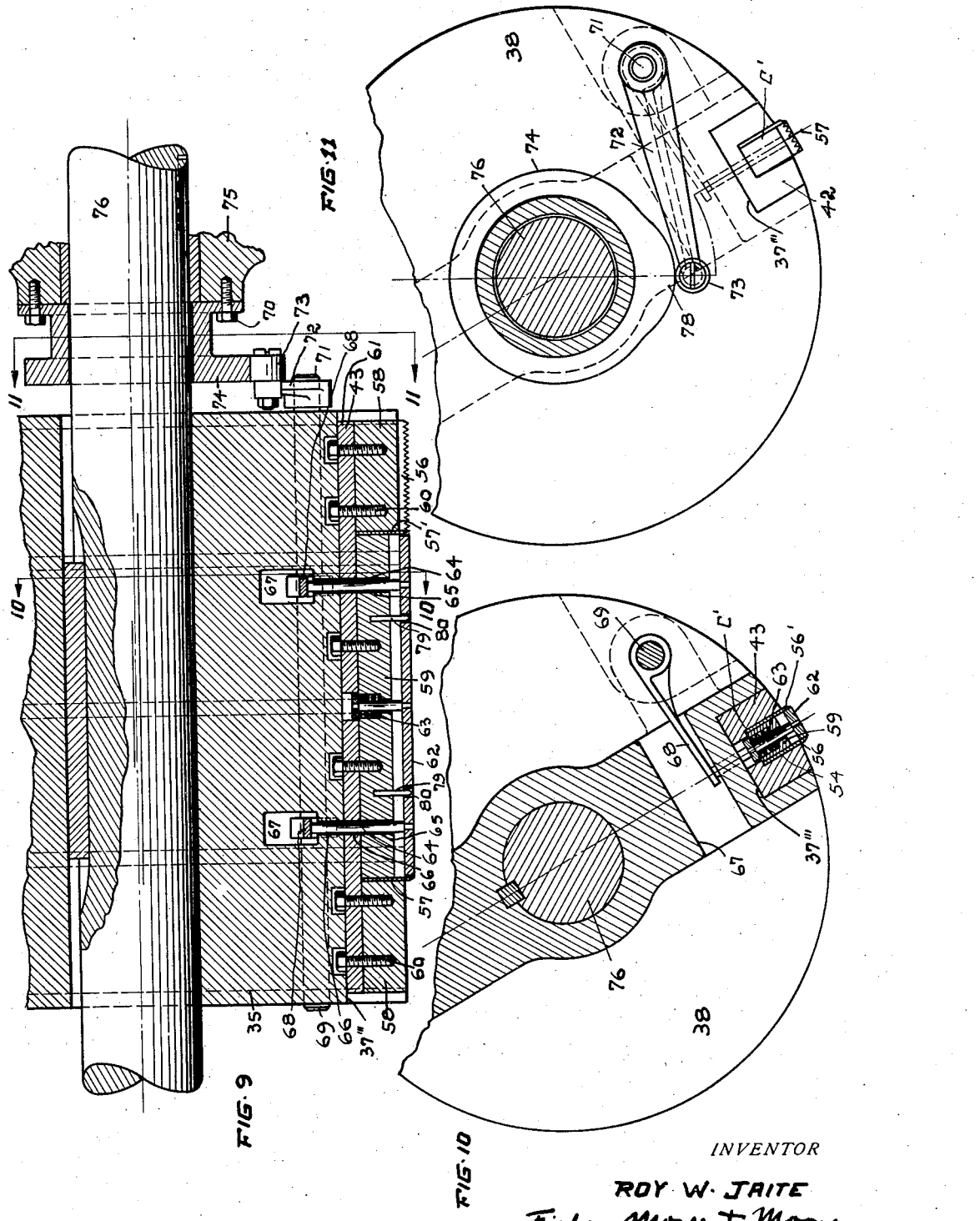
INVENTOR
ROY W. JAITE
Fisher, Moser + Moore
ATTORNEY Feb. 13, 1934.    R. W. JAITE    1,947,396
MACHINE FOR MAKING PAPER BAGS
Filed June 19, 1931    8 Sheets-Sheet 8
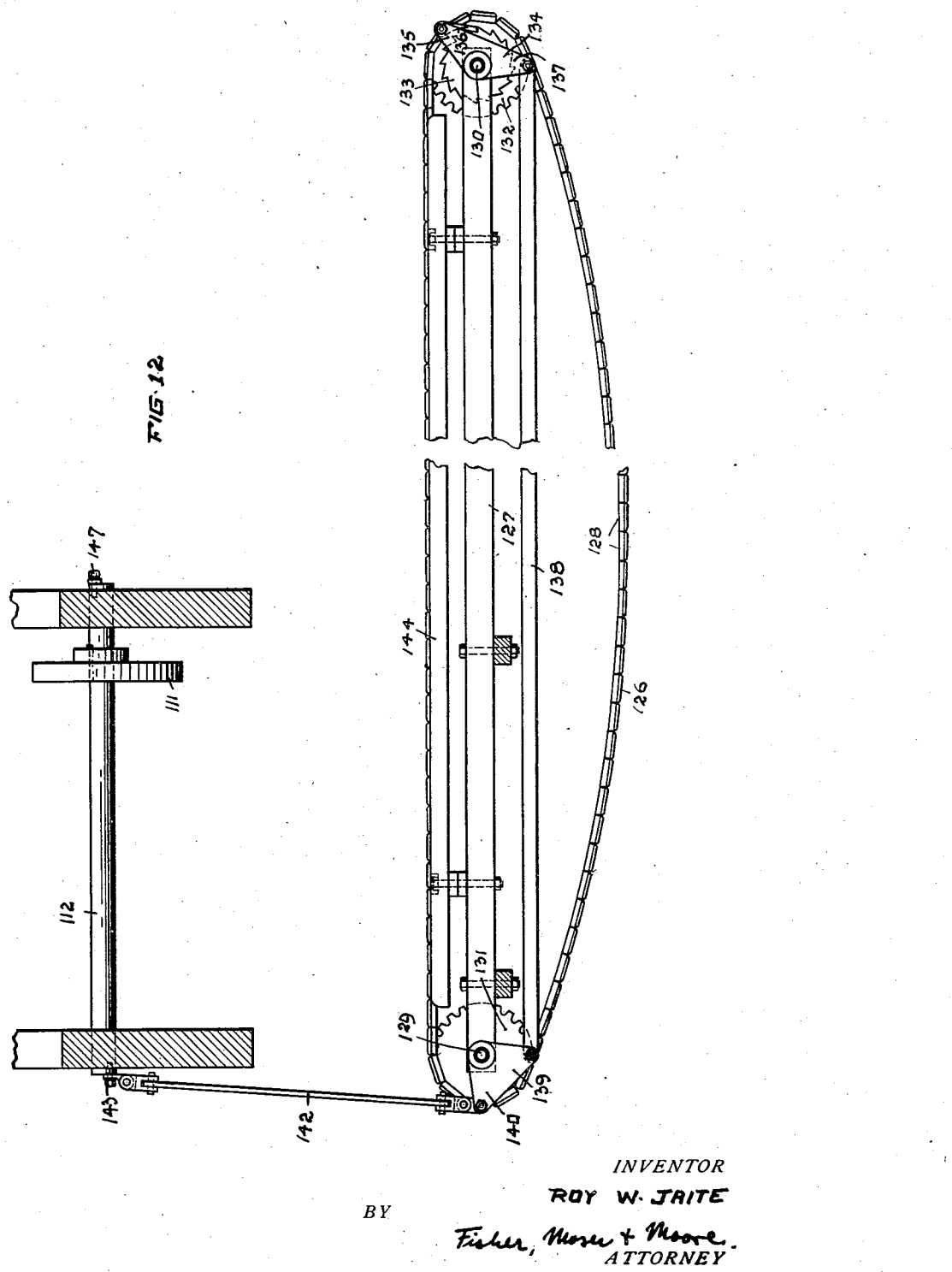
INVENTOR
ROY W. JAITE
BY
Fisher, Moser + Moore
ATTORNEY Patented Feb. 13, 1934

1,947,396

UNITED STATES PATENT OFFICE 1,947,396

MACHINE FOR MAKING PAPER BAGS

Roy W. Jaite, Lakewood, Ohio

Application June 19, 1931. Serial No. 545,408

5 Claims. (Cl. 271—64)

This invention relates in general to machines for making paper bags which have their opposite ends closed, such for example, as the so-called valve type bags, in which the body of the bag is composed of a multiple or plural number of flat tubes or tubular plies, and provided with a self-closing valve in one angular corner. Bags of this kind are made from plicated or pleated tube sections, produced in a tubing machine, and the tube sections are provided in one angular corner thereof with an integral narrow extension, necessary to supply sufficient stock for the valve. As the length of these tube sections is governed by the length of the finished bag plus the length of the integral extension, substantial waste occurs in cutting and trimming operations incident to forming the extensions. The general object of the present invention is to decrease the amount of waste during the respective operations of cutting the tube into tubular sections, and forming the extensions. Such object is accomplished by cutting the continuously creased and folded tube transversely along predetermined lines, so that the extensions of adjoining tube sections will be formed on opposite edges of said sections, and said cutting line will either delineate the tops or the bottoms of successive sections. Cutting of the continuous tube in the manner just described, decreases the waste substantially, compared with cutting operations now generally practiced, as a portion of the strip previously cut from one single tube section is by the present cutting operation partly utilized in forming the extension of the adjoining section.

As the cutting operation produces sections having their extensions alternately arranged on opposite edges it is desirable that the sections must be so separated into groups that the top edges and the extensions of all sections of a group will be aligned with respect to each other. This arrangement of tube sections permits the operator of a finishing machine, which tucks the valve and closes the sections at opposite ends, to readily feed the sections into the machine, without the necessity of turning alternate sections. The separation of the sections into groups is accomplished by means of a switch or turnout member arranged in main guide tracks, and adapted to permit alternate sections to proceed along the main track to a conveyor and to deflect the next succeeding tube sections to a second conveyor. This switch or turnout member, is automatically actuated by the cutting mechanism and so timed with respect thereto that every other or alternate tube section will be deflected by the switch point to the conveyor of its particular group. The cutting mechanism is also provided with means for carrying the strip of waste paper, produced during cutting operations, to a remote point where it will not interfere with the general operation of the machine. The tubing machine employed in performing the operations hereinbefore mentioned is of old and well known construction with the exception of the cutting, separating, and delivery mechanism, all as hereinafter more fully described and brought out in the following description of a preferred form of the invention and the attached drawings forming part thereof, and as more concisely pointed out in the appended claims.

Figure 3:
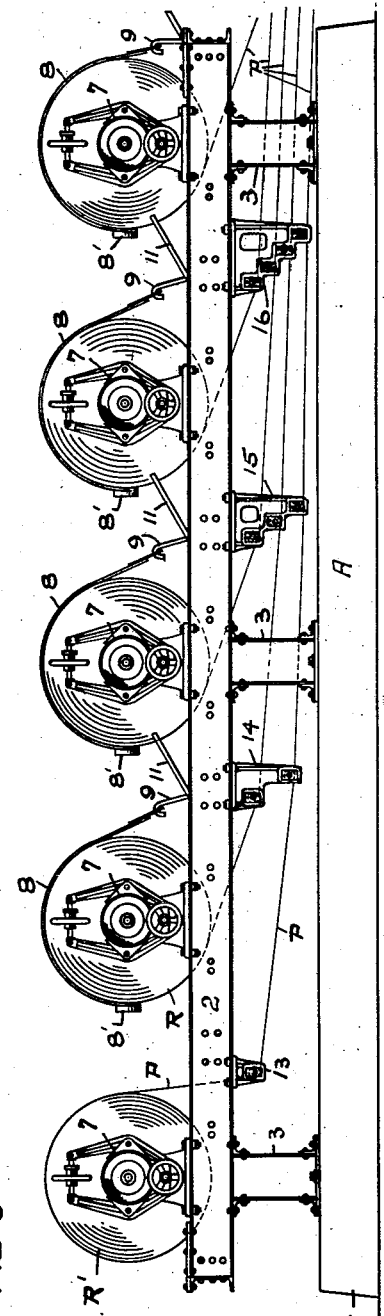
Figure 4:
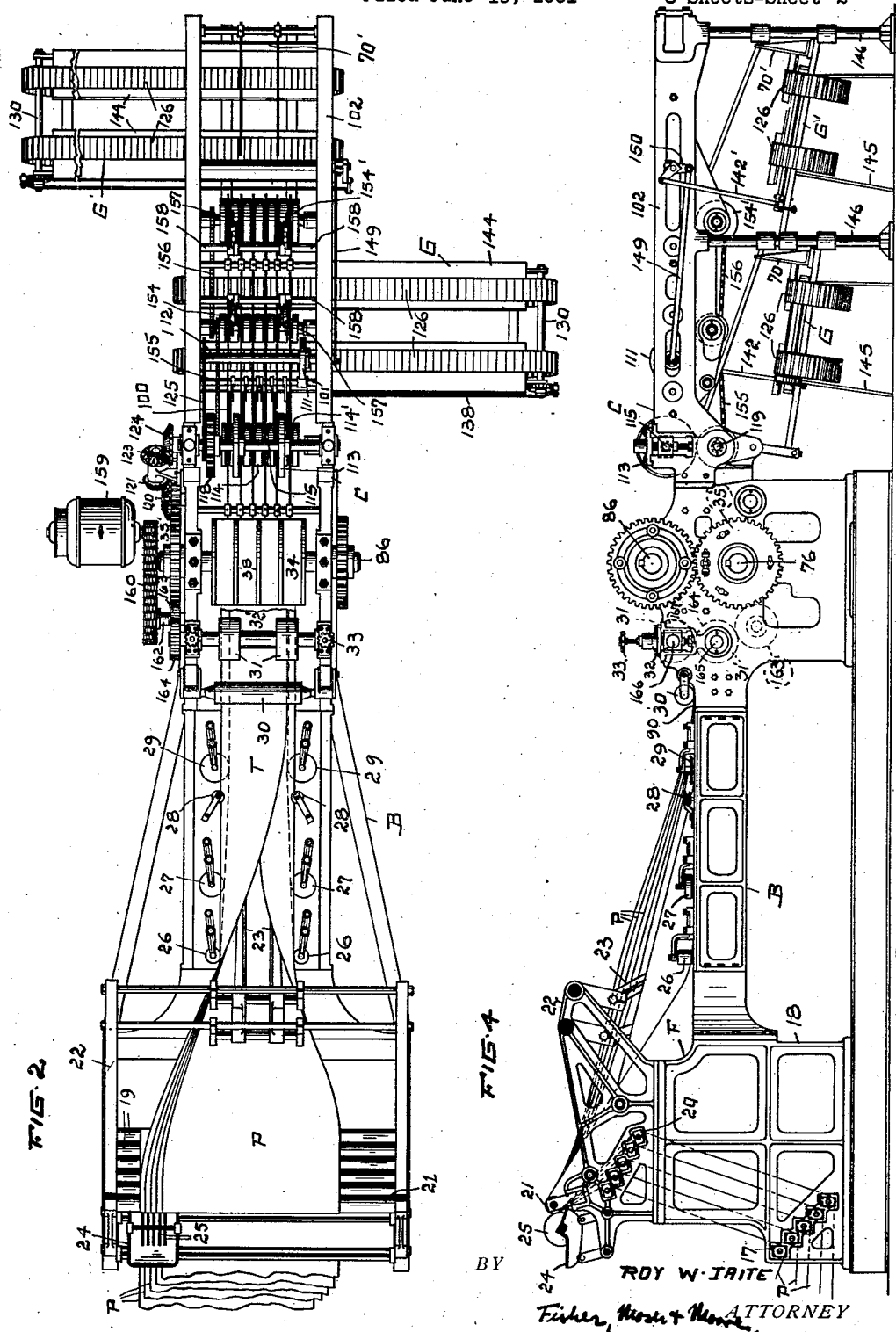
Figure 5:
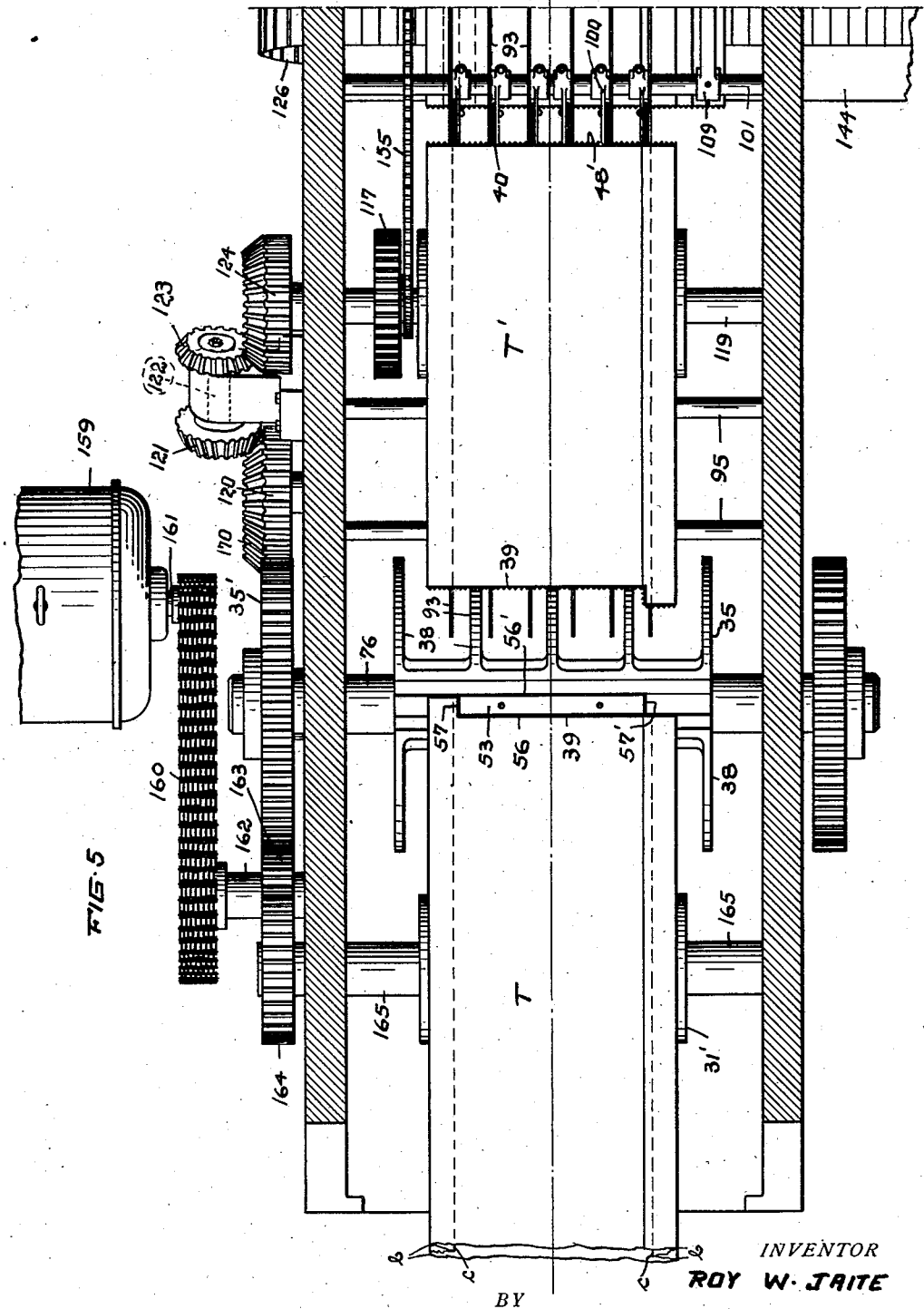
Figure 6:
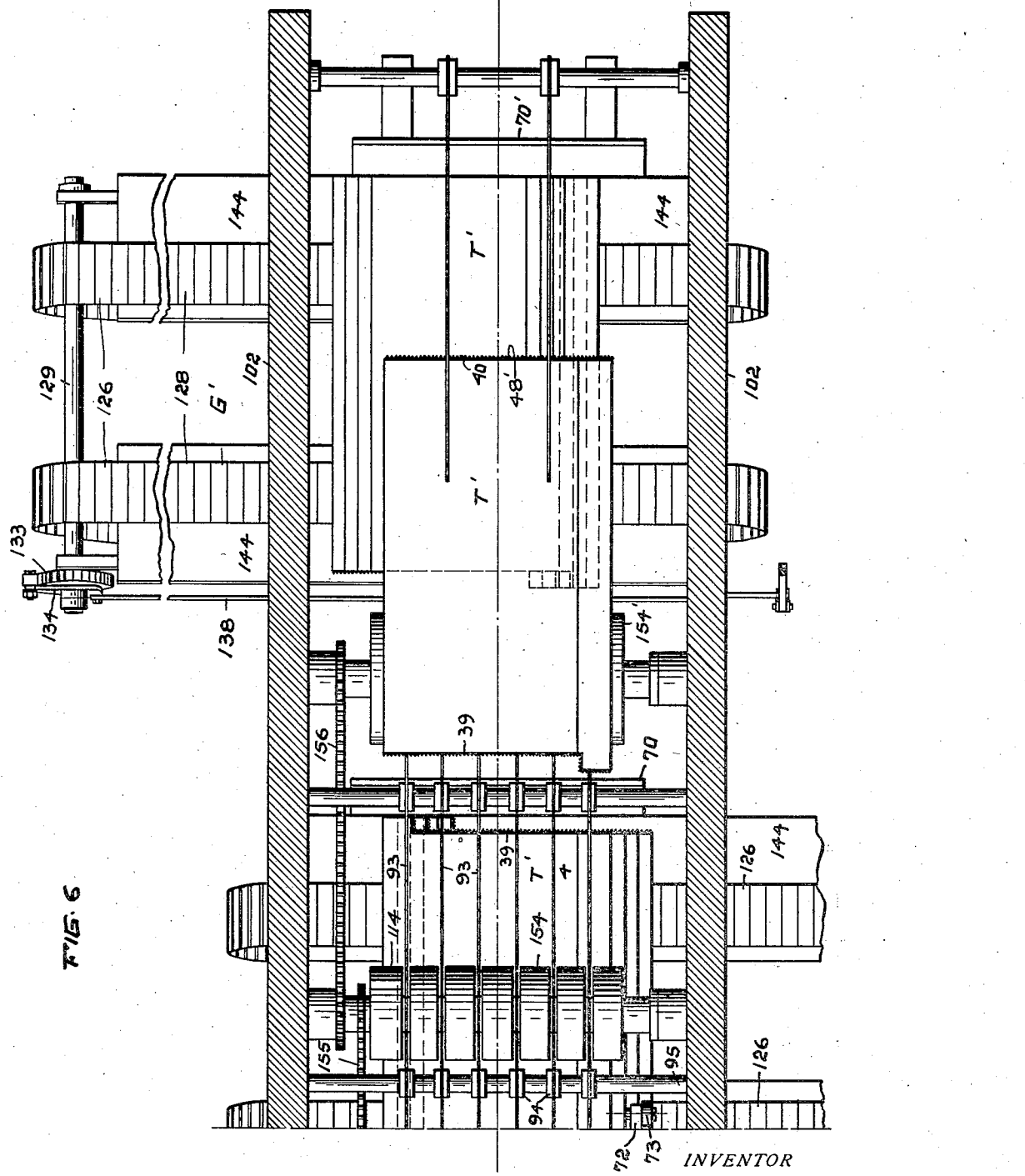
Figure 7:
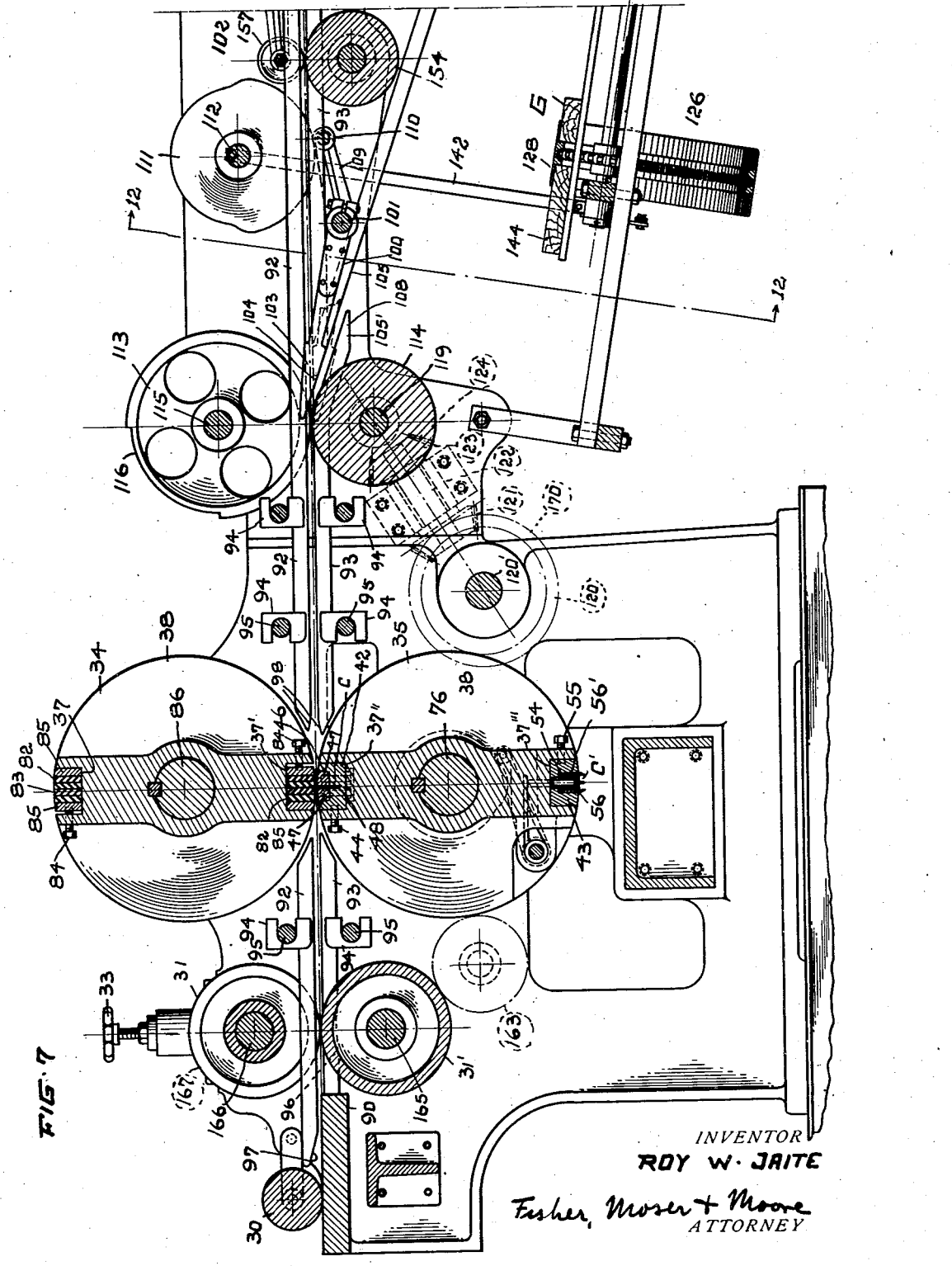
Figure 8:
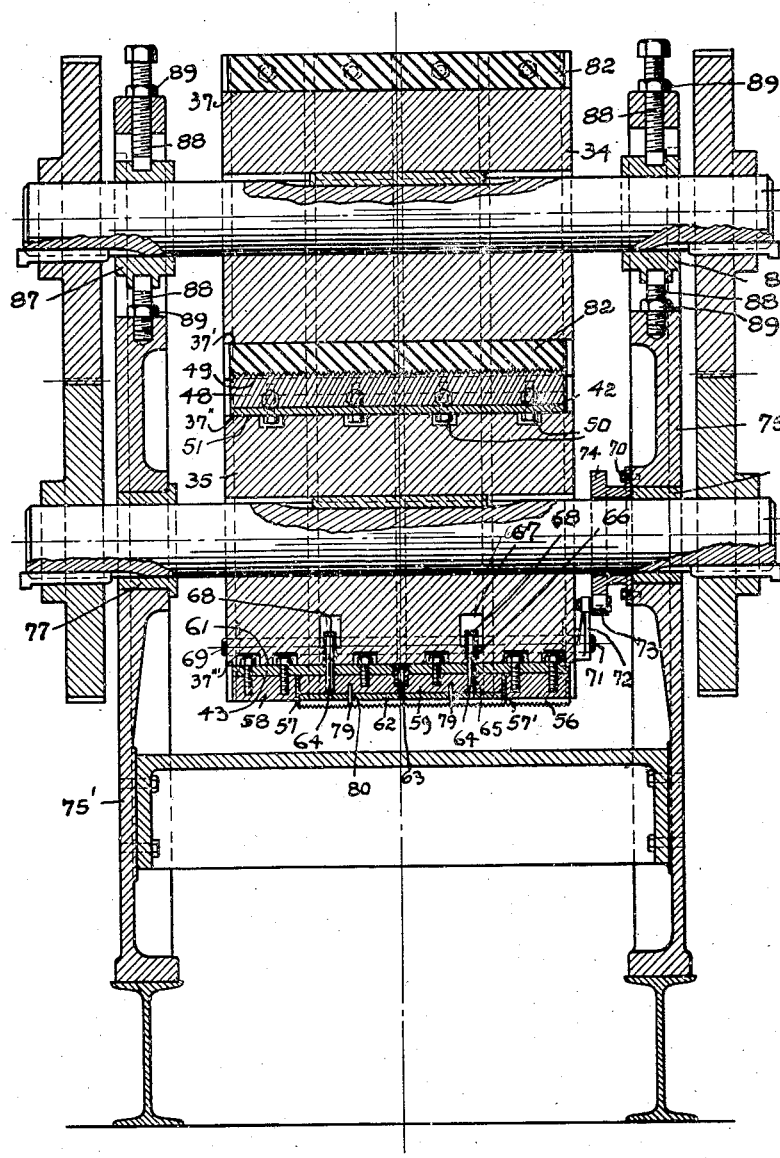

In the accompanying drawings Figure 1 and Figure 2 are respective plan views of a tubing machine, and the cutting, delivering, and conveying mechanism of the present invention. Figure 3 and Figure 4 are side views of the tubing machine shown in Figures 1 and 2. Figure 5 and Figure 6 when combined, represent an enlarged horizontal sectional view through the cutting and delivery end of the tubing machine, showing the manner of delivering tube sections to the two conveyors, extending to opposite sides of the machine. Figure 7 is a longitudinal sectional view through the cutting and delivery mechanism of the tubing machine. Figure 8 is a vertical section through the cutting roll and platen roll. Figure 9 is an enlarged longitudinal section of a part of the cutting roll showing the plunger disk in discharge position. Figures 10 and 11 are cross sectional views through the cutting roll on lines 10—10 and 11—11, respectively, of Figure 9, and Figure 12 is a cross sectional view on line 12—12 of Figure 7, showing one conveyor in side elevation.

The tubing machine herein described is particularly designed to produce a plicated tube, and then cut said tube into sections having an integral extension, adapted to form the valve wings of a self-closing valve in the finished bag. The continuous tube, formed and finished in the tubing machine, has a wall thickness of five plies, each ply being shaped and folded to form individual tubes sleeved one within the other. The overlapping seams of these individual tubes are offset with respect to each other to simplify the seaming operation, and to prevent undesired excessive wall thickness in one particular area. The machine comprises three sections, the paper supply section A, the forming and tubing section B, and the cutting and delivery section C. Of course all three sections of the machine cooperate continuously in producing the finished product, but each section acts distinctly and individually so that the operation of the machine is best understood by describing each section separately.

Paper supply

The general function of the paper supply or feeding section is to simultaneously supply a plurality of wide paper sheets to the forming and tubing section of the machine. This section comprises a rectangular main frame 2 of channel iron construction having legs 3 mounted on a base 4. Main frame 2 carries a series of bearing brackets 5, adapted to removably support the projecting ends of shafts 6, on which are mounted large rolls of paper R—R'. These rolls are laterally offset or stepped with respect to each other to cause the overlapping seams of the individual tubes to lie in offset relation to each other, as will be later described. Adjustable brake members 7, one for each of said shafts 6, mounted on frame 2 in alignment with bearings 5, retard the rotation of the rolls and keep the paper sheets under tension as they pass through the machine. The tension of the sheets of each roll R may be additionally adjusted by means of friction belts 8 connected at one end with the arm 9 of a pivotally supported shaft 10 and connected at its other end to a weight 8', a hand lever 11 being provided to increase or decrease the amount of belt surface in frictional engagement with the rolls. The sheets of paper P, as they unwind from rolls R' and R pass downwardly around rollers 12, journaled at their opposite ends in bearings 13, 14, 15, and 16, suspended from main frame 2, and thence around corresponding rollers 12 in bearings 17 mounted in frame 18 of the forming and tubing section B. The number of rollers 12 supported by bearings 13, 14, 15, 16, and 17 vary according to the number of paper sheets guided thereby, there being one roller for each sheet. It will be noted that the number of sheets to be guided progressively increase, that is the roller 12 in bearing 13 guides one sheet; corresponding rollers 12 in bearings 14 guide two sheets and the five rollers 12 of bearing 17 guide five sheets, one from each roll R and R'.

Forming and tubing

As delineated above, each sheet of paper P passes around one of the rollers 12 of bearing 17 in frame 18, and thence upwards toward and around a roller 19 in bearings 20 of the frame. Thereafter all sheets are brought together, by passing them around an idler roller 21, situated upon the top of frame 18. Idler roller 21 is situated adjacent a paste pot 24, having a series of thin, paste applying wheels 25 mounted therein, which transfer a narrow band of paste continuously to the face of the stepped paper sheets P near one longitudinal edge thereof. The stepping of the sheets P, as best illustrated in Figs. 1 and 2, facilitates the application of the paste, preliminary to the folding and seaming operations.

After the sheets of paper P have been supplied with paste as described, they are simultaneously folded into a flat plicated tube T, having four outer folds or border edges b and the inner fold lines c. These side plications or folds are made as the sheets of paper P pass lengthwise of a tube-forming device F, including shoe 23 suspended from arms 22 of frame 18, a pair of rollers 26, a pair of flat rollers 27, a pair of rotatable channeled rollers 28, and a pair of idler roller disks 29. The distance between these rollers and disks is considerably less than the width of the sheets of paper, and consequently the sides of the paper sheets while traveling under shoe 23 are folded upwardly around the shoe and are finally brought into overlapping relation, as will be presently understood.

The operation of folding the sheets into a plicated tube and pasting operations also involves the use of a horizontal roller 30 and a pair of upper and lower feed and presser rolls 31—31', situated opposite the plicated edges of the tube T, and guided in adjustable bearings 32, hand wheels 33 being provided for raising or lowering upper roll 31. The middle portion 32' of upper roll 31 is recessed or of less diameter than the two ends thereof to prevent the spreading of the paste beyond the edges of the overlapping flaps of the tube, especially at points where an excess amount of paste has been applied by wheels 25. When the rolls are in operation, a pulling tension is maintained on the sheets of paper and tubes T until the folding and sealing of the tubes has been practically completed, and this pulling tension is applied to the sheets P and tube T formed therefrom throughout their entire length. As the tubes pass from the tube forming device under roller 30, and between rolls 31—31', the creased border edges of the tube are pressed flat and sharply defined before the tubes pass onward to the cutting and delivery section of the machine.

Cutting and delivery

After the tube T has passed between the rolls 31—31', it is pushed by the action of these rolls, between a platen roll 34 and a cutting roll 35, where the tube T is severed into sections T'. These rolls 34 and 35 are of equal diameters and the cutting roll is provided with cutting blades so positioned that two equal sections T' are cut from tube T, during one complete revolution of the rolls. The body of each roll 34 and 35 is formed with two oppositely disposed channels 37—37' and 37''—37''' respectively, and the circumferential walls of the rolls are recessed to decrease the weight thereof, and to form a series of half-circular narrow flanges 38, adapted to draw the plicated tube T into the cutting rolls and to force the tube sections T' severed therefrom to their respective conveyors G. The cutting operations are effected by cutting blades C—C', hereinafter described, which are rigidly held in channels 37''—37''' of lower cutting roll 35 by means of blade holders 42 and 43 and set screws 44 and 55. Two substantially different cuts are made during a single revolution of the cutting rolls, thus one cut shapes the tops 39 of adjoining sections, whereas the other forms the bottoms 40 of such sections. Blade holder 42 is in the form of a U-shaped metal casting, having slanting inner side walls 46, co-operating with clamping jaws 47 for rigidly clamping and holding a straight steel blade 48. The cutting edge 49 of blade 48 is serrated to produce a dentilated cut as indicated at 48' in Figures 5 and 6. Screws 50 extending through web portion 51 of cast metal holder 42 are utilized to draw the jaws 47 into rigid clamping engagement with steel blade 48. As shown, cutting the edge 49 of blade 48 protrudes from the periphery of cutting roll 35 a substantial distance and therefore is adapted to push the tube sections onward after the cutting operation. It is to be understood that straight blade 48 in blade holder 42 cuts the bottoms 40 of tube section T', whereas the tops of such sections are formed by cutting blades 56—56', in channels 37''', which blades also extend substantially beyond the periphery of roll 35. These latter blades also convey the waste strips 53, cut from the tube T when the latter is cut into sections T' to a point of discharge to prevent this waste material from interfering with the general operation of the machine.

The blades 56—56' are securely held in a U-shaped cast metal holder 43, seated in the channel 37'' arranged diametrically opposite to channel 37'', set screws 55 being employed to secure the casting in place. This casting is formed with a recess 54 in which the two relatively long blades 56—56' are mounted. These blades are arranged in parallel relation with respect to each other, and transversely with respect to the tube T, and are spaced apart sufficiently to sever a waste strip 53 of the desired width. One end of cutting blade 56 is extended laterally in one direction beyond one side edge of the tube T, whereas the cutting blade 56' is laterally extended in an opposing direction beyond the opposite side edge of the tube. The other ends of the blades 56—56' are angularly offset in opposite directions to provide short cutting blades 57—57' which are longitudinally disposed with respect to the tube T, and which sever the ends of the waste strips 53. It can readily be seen that the blades 56—56', 57—57' define the rectangular area of the strips 53, severed in the operation of sub-dividing the tube T into sections T'. These blades also frictionally grip the edges of the cut strips 53 and carry the strips for a portion of a revolution of cutting roll 35, before the strips are discarded, while the extended ends of elongated blades 56—56' cut the adjoining areas of the tube, and complete separation of the tube sections T' from tube T simultaneously with the cutting of the strip 53 therefrom. While I have shown the short cutting blades 57—57' as being offsets of and integrally formed with the transverse blades 56—56' the former may be made separate from the latter.

Clamping blocks 58 and 59 employed to clamp the cutting blades 56—56', 57—57', in place, are rigidly attached to blade holder or casting 43, by means of set screws 60, which extend through the web portion 61 of the casting. The two end blocks 58 clamp the extended ends of blades 56—56' and the centrally disposed block 59 serves to clamp those portions of the blades designed to sever strip 53. Block 59 is made of less height than clamping blocks 58, to accommodate a shiftable stripper plate or member 62, designed to eject the waste strips 53 at predetermined intervals, a spring-pressed plunger 63 being employed to yieldingly force the stripper plate inwardly against the block 59. Secured to the plate 62, adjacent the ends thereof are a pair of guiding and actuating rods 64, extending through perforations 65 in block 59 and through perforations 66 in web portion 61 of blade holder 43. These rods extend into slots 67 in the body of cutting roll 35, for co-operation with lever arms 68 of a rock-shaft 69, pivotally mounted in cutting roll 35. One end 71 of shaft 69 carries a lever 72 on the free end of which is mounted a roller 73, co-operating with and engaging a cam 74 in turn rigidly attached to standard 75 of the frame of the machine by means of screws 70. Cam 74 is concentric with shaft 76, to which cutting roll 35 is keyed, and this shaft is journaled in bearings 77 in standards 75 and 75' respectively. It will thus be seen that the roll 35 imparts oscillatory movement to rock shaft 69 which in turn reciprocates rods 64 and plate 62, thus causing the ejection of the waste strips 53 at a predetermined point in the revolution of the cutting roll. The radial movement of plate 62 with respect to the axis of the roll, is of course governed by the shape of cam face 78 on cam 74. A pair of needles or pins 79 may be employed to supplement the gripping action of the cutting blades during the travel of the knives after the cutting operation to the place of discharge of the waste strip 53. These needles are rigidly mounted in block 59 and extend through openings 80 in plate 62, in position to pierce and hold strip 53 until plate 62 ejects them.

The upper or platen roll 34 is provided with oppositely disposed resilient platen or backing members 82, with which cutting blades 48 and 56—56', and 57—57' engage during the simultaneous rotation of rolls 34 and 35. These members 82 consist of a series of radially disposed rubber fabric layers 83, embedded in channels 37—37' of platen roll 34 and rigidly held therein by means of set screws 84, which engage one of two side plates 85. Roll 34 is rigidly keyed to a shaft 86, mounted in bearings 87 in standards 75—75', which bearings are vertically adjustable by means of screw members 88 and lock nuts 89, to adapt the machine to tubes of different thicknesses, that is, tubes having different numbers of plies.

After passing seaming roller 30 on table 90, the tube T is guided by a plurality of pairs of laterally spaced upper and lower tracks or guide members 92 and 93 respectively, preferably formed of narrow steel bars, which tracks are mounted in brackets 94 sleeved upon cross rods 95. These tracks extend in spaced relation over the entire width of the bag, and pass through narrow circumferential slots 96 in feed and presser roll 31', but it will be noted that the tracks are interrupted adjacent the rolls 34—35 for an obvious purpose. The receiving ends of these tracks are beveled as at 97 and 98 to facilitate feeding of the tube T therein between.

As previously stated alternate finished tube sections must be separated and conveyed to different points. This is accomplished by means of a plurality of switch members 100, one for each pair of upper and lower tracks 92—93, which members are rigidly clamped upon a rock shaft 101, in turn pivotally mounted in the opposite walls of frame 102. Each switch member 100 is positioned closely adjacent its corresponding track and includes a spear-shaped end or point 103 adapted to deflect or guide alternate sections to upper and lower side tracks 105—105' leading to one of the conveyors G. By rocking shaft 101, switch point 103 may be raised to align its face 104 with the upper members or tracks of the side tracks 105—105', to deflect the particular tube section from the main tracks. A portion of each lower main track 93 is preferably cut and downwardly bent as at 108 to form the bottom member 105' of the side tracks. It will be understood that the approaching tube sections T' will be guided downwardly from between pairs of upper and lower main track members 92—93, to the intervening space between upper and lower side tracks 105—105', when the switch points 103 are in raised position, and that when the latter are lowered the next approaching sections will travel forwardly over or between the main tracks.

Shaft 101 is rocked by means of a lever 109 rigidly attached thereto, which supports at its free end a roller 110, associated with a cam member 111, keyed to rotatable shaft 112, which in turn is journaled in frame 102. Shaft 112 is rotated in timed relation with respect to rolls 34, 35, as will be later described, and therefore shifting of switch 100 is correspondingly timed. The severed tube section in approaching the branch track travels over a roller 114 mounted on drive shaft 119, which roller is provided with a plurality of peripheral recesses 114' adapted to receive the lower main tracks 93. Mounted on shaft 115 positioned above and in vertical alignment with shaft 119 are a pair of drive wheels or disks 113, which extend between adjacent upper track portions 92 in position to co-operate with the unrecessed portions of the roller 114 in feeding the tube sections forwardly, or to the side tracks according to the position of the switch 100. The periphery of the disks 113 are recessed at 116, for approximately one fifth of their circumference to facilitate gripping of the tube sections after leaving rolls 34—35, where they are severed from the tube T. Shaft 115 is driven through shaft 119 by means of gear 117 thereon which meshes with gear 118 on shaft 115, shaft 119 in turn being driven from main drive shaft 76 on which cutting roll 35 is mounted. This drive is effected through gear 35' on shaft 76 which meshes with and rotates idler gear 120, on shaft 120'. This idler gear has a beveled toothed face 170, which meshes with a bevel gear 121 on one end of a short shaft 122, mounted on the other end of which is a beveled gear 123, which in turn meshes with a beveled gear 124 on shaft 119. A chain drive 125 between shafts 115 and 112 imparts rotatable movement to the latter shaft, so that rotation of cam 111 mounted on shaft 112 is positively governed by and timed with respect to rollers 34—35.

Main tracks 92—93 and side tracks 105—105', respectively lead to inclined conveyors G—G' on opposite sides of the machine, each of which consists of a pair of endless belts 126 composed of links 128. These belts are intermittently driven by a ratchet mechanism. To this end, the frame 127 of conveyors G—G' supports on opposite ends thereof rotatable shafts 129—130, respectively, which rigidly support guide sprockets 131, 132, over which the belts 126 travel. Keyed to shaft 130 is a ratchet gear 133, co-operating with a bell-crank 134, pivotally mounted on said shaft. Arm 135 of bell-crank 134 carries a ratchet lever 136 adapted to cooperate with ratchet gear 133, and the other arm 137 thereof is connected to a second bell-crank 139 pivotally mounted on shaft 129 by means of rod 138. Arm 140 of bell crank 139 is coupled with an eccentric pin 143 mounted on shaft 112, by means of a connecting rod 142, with freedom for slight lateral movement. Rotation of shaft 112 therefore imparts reciprocating movement to rod 142, which in turn oscillates bell crank 134 and the ratchet mechanism previously described for intermittently advancing belts 126. Slides 144 mounted on conveyor frame 128 are provided for supporting the upper flight of belts 126, the conveyor frame in turn being supported by legs 145, and standards 146 at the front end of the machine.

The conveyor G' which is identical in construction with conveyor G is driven by mechanism actuated by an eccentric pin 147 at the opposite end of shaft 112 to that which carries pin 143, pin 147 being offset 180° with respect to pin 143 so that the two conveyors advance alternately. Pin 147 imparts reciprocatory movement to rod 149, which oscillates a pivotally mounted lever 150, coupled with a second push rod 142' adapted to actuate the ratchet mechanism for conveyor G', which is identical in construction and operation to the mechanism for actuating conveyor G. As the alternate tube sections are delivered to their respective conveyors, the sections are stopped in proper position on the top flight of the respective belts 126 by means of stop members 70—70'.

A pair of rollers 154—154' driven from shaft 119 by chains 155—156, respectively, feed those alternate tube sections T' forwardly which are to be delivered to the conveyor G'. These rollers, like the roller 114, are recessed to receive the lower part 93 of the main track. Positioned above each roller 154—154' are a plurality of small freely rotatable and yieldingly mounted presser wheels 157, mounted on cross shafts 158, which rolls co-operate with rollers 154—154' in an obvious manner.

The machine is driven from motor 159 by means of a belt 160 which connects the motor shaft 161, with a shaft 162, on which is mounted a gear 163, meshing with gear 35' on cutting roll shaft 76. Gear 163 also meshes with a gear 164 on the shaft 165 of lower feed roll 31', which shaft 165 in turn drives the shaft 166 of upper feed roll 31 by means of gears 164 and 167 on the respective shafts.

What I claim, is:

1. In a tubing machine for making tubular sections for valved paper bags including means for consecutively cutting and separating said tube into tubular sections, a main track for guiding the sections cut from said tube, a side track extending from said main track, a shiftable switch member for connecting said main track with said side track, coupling means between said switch member and said cutting means for timing the shifting of said switch member with respect to said cutting means, intermittently advanced conveyor means on opposite sides of the machine at the end of said main track and said side track and driving means for said conveyor means timed to advance same during shifting of said switch member.

2. In a tubing machine including means for consecutively cutting and separating a tube into tubular sections, a track for guiding said tube and tubular sections, a side track extending from said track, a shiftable switch member adapted to connect said track periodically with said side track, coupling means between said cutting means and said switch member, intermittently advanced conveyor means on opposite sides of the machine at the end of said main track and said side track and driving means for said conveyor means timed to advance said conveyor means during shifting of said switch member.

3. In a tubing machine for making tubular sections for valved paper bags from a continuous tube including rotary cutting means, a series of upper and lower horizontally aligned spaced bars for guiding said tube and tube sections therebetween, said lower bars including a series of short bars having their end portions inclined to form a side track for guiding said tube and sections, a shiftable switch member adapted to connect said horizontally aligned bars with the inclined portions of said short bars, coupling means between said cutting means and said switch member, intermittently advanced conveyor means on opposite sides of the machine at the end of said horizontal bars and said inclined bars, and driving means for said conveyor means timed to advance said conveyor means during shifting of said switch member.

4. In a tubing machine including means for consecutively cutting and separating a tube into tubular sections, a track for guiding said tube and tubular sections, a side track extending from said track, a shiftable switch member adapted to connect said track periodically with said side track, coupling means between said cutting means and said switch member, conveyor means on opposite sides of the machine at the end of said main track and said side track, ratchet mechanism for driving said conveyor means intermittently and driving means for said ratchet mechanism, said ratchet mechanism being timed to advance said conveyor means during shifting of said switch member.

5. In a tubing machine including means for consecutively cutting and separating a tube into tubular sections, a track for guiding said tube and tubular sections, a side track extending from said track, a shiftable switch member adapted to connect said track periodically with said side track, conveyor means on opposite sides of the machine at the end of said main track and said side track, ratchet mechanism for driving said conveyor means intermittently, driving means for said ratchet mechanism, and coupling means between said cutting means, said switching member and said ratchet mechanism and driving means for timing the shifting of said switch member and said ratchet mechanism with respect to said cutting means.

ROY W. JAITE.